R. MARSH.
Lamps.

No. 139,964.

Patented June 17, 1873.

Witnesses:
A. Benneixendorf.
Selguick

Inventor:
R. Marsh
Per
Attorneys.

UNITED STATES PATENT OFFICE.

RIVERIUS MARSH, OF FLUSHING, NEW YORK.

IMPROVEMENT IN LAMPS.

Specification forming part of Letters Patent No. 139,964, dated June 17, 1873; application filed April 12, 1873.

*To all whom it may concern:*

Be it known that I, RIVERIUS MARSH, of Flushing, in the county of Queens and State of New York, have invented a new and useful Improvement in Lamps, of which the following is a specification:

My invention consists of a metal lamp-top so constructed as to form an oil-receiver or drip-cup at the connection where the burner is attached, also an inverted collar for the attachment of the safety-tube, and also a collar for attaching it to the collar or neck on the top of the glass reservoir, by screwing on or otherwise, and provided with a vent for the escape of the gas, all so as to form a strong, ornamental, and protecting detachable metal portion for the lamp, as will be hereinafter described.

Figure 1:
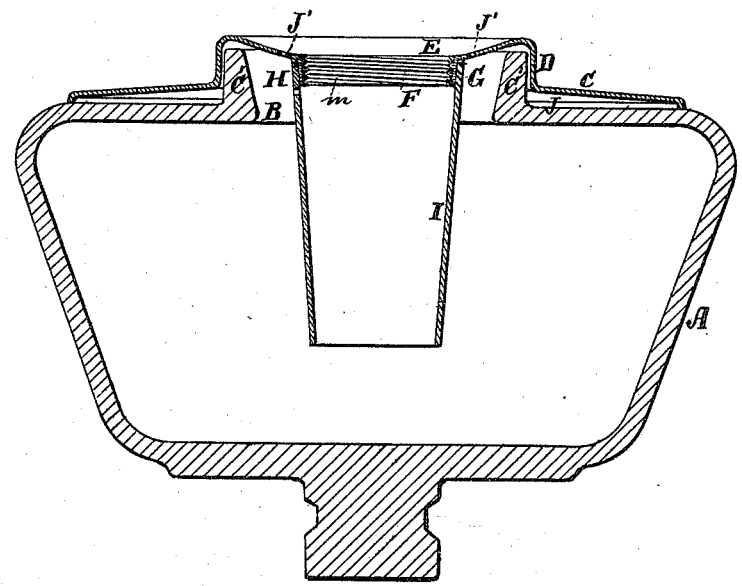
Figure 2:
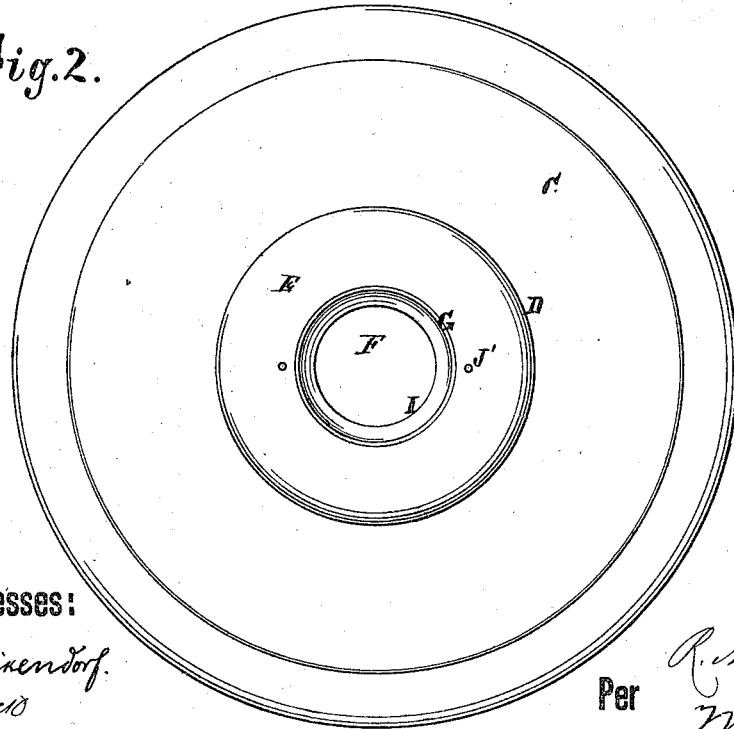

Figure 1 is a sectional elevation of a lamp, with a metal portion and a glass reservoir such as I propose to make; and Fig. 2 is a top view.

Similar letters of reference indicate corresponding parts.

A represents the oil-reservoir, which is of glass, with a large opening, B, and an annular collar, C', extending above the top around the opening. C is a metal disk as large or nearly so as the top of the glass reservoir, provided with a collar, D, for fastening onto the collar C', by screwing or otherwise, also with a drip-cup, E, to receive the waste from the burner, also with a hole, F, at the middle for receiving the burner, and also with a collar, G, extending downward therefrom into the opening B, to form the screw m for screwing the burner in and for attaching the safety-tube I. The collar D, drip-cup E, and collar G are all formed of the disk, either by stamping and drawing it to the required shape or spinning it. It is so formed that a space is provided at J, between it and the top of the lamp, which may be filled with plaster of Paris or other cement, to make a bed for the disk, and unite it to the glass and protect the latter from the heat. The hole F and collar G are made considerably smaller in diameter than the opening through the lamp-top, to form a gas chamber, H, wherein the gas may collect above the oil and escape therefrom through the small vents J', which I provide in the drip-cup near the bottom for the purpose, also for the oil to flow from the cup into the lamp if it will, but probably the oil will generally find its way back at the screw-joint where the burner screws in.

By this construction I have a lamp with a top having all the advantages of a metal lamp, and a reservoir or oil-holder of glass through which the oil can be seen so as to know when the lamp needs filling.

Having thus described my invention, I claim as new and desire to secure by Letters Patent—

The combination, with a glass oil-reservoir, A, of a metal lamp-top, provided with an annular extension covering the top of the lamp, so constructed as to form an oil-receiver, E, and a collar, G, and having the safety-tube I attached to said collar, substantially as specified.

RIVERIUS MARSH.

Witnesses:
T. B. MOSHER,
ALEX. F. ROBERTS.